Dec. 15, 1970   L. S. SHEINER   3,547,513
SPLIT FIELD OPTICAL COMPARISON SYSTEM
Filed June 10, 1968   2 Sheets-Sheet 1
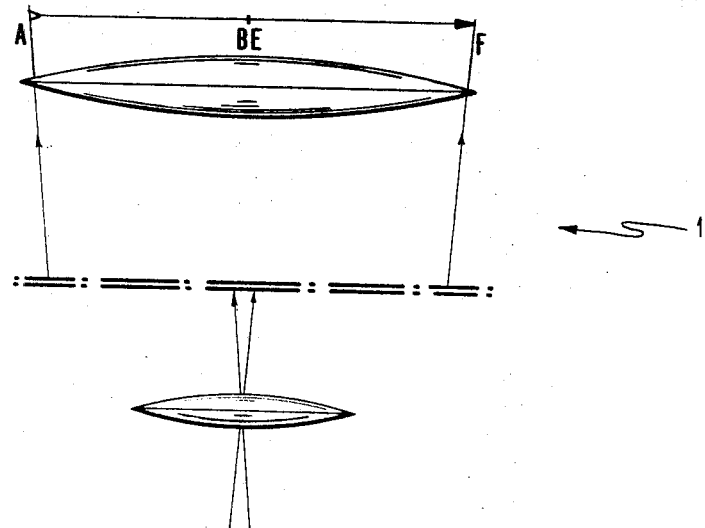
FIG. 1
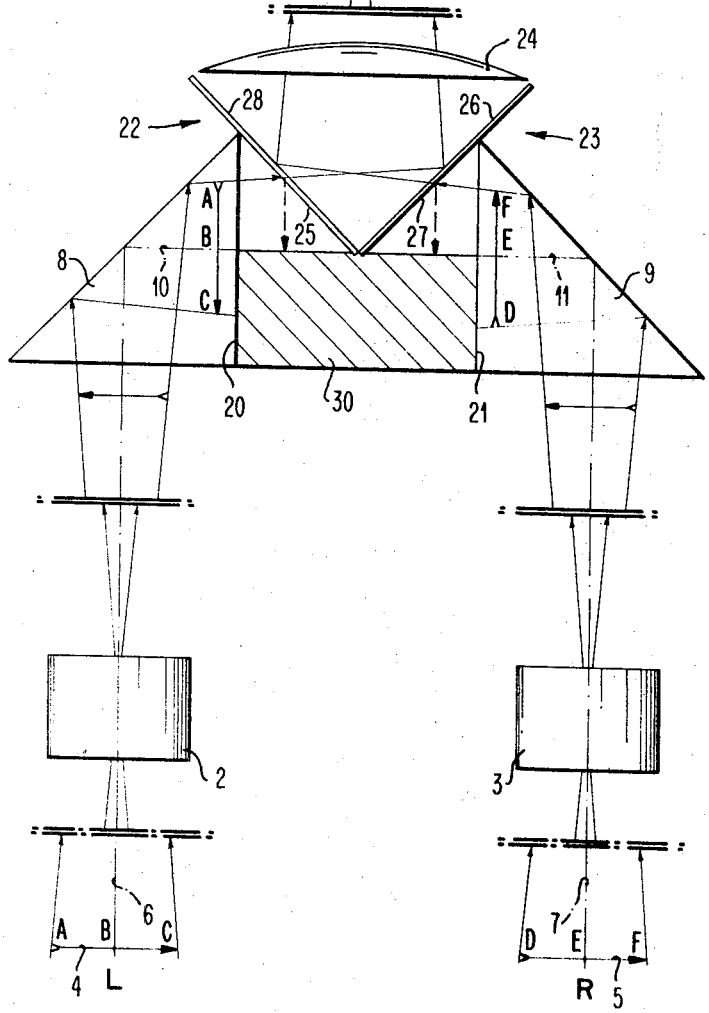
INVENTORS
LEONARD S. SHEINER
BY Henry Powers
ATTORNEY

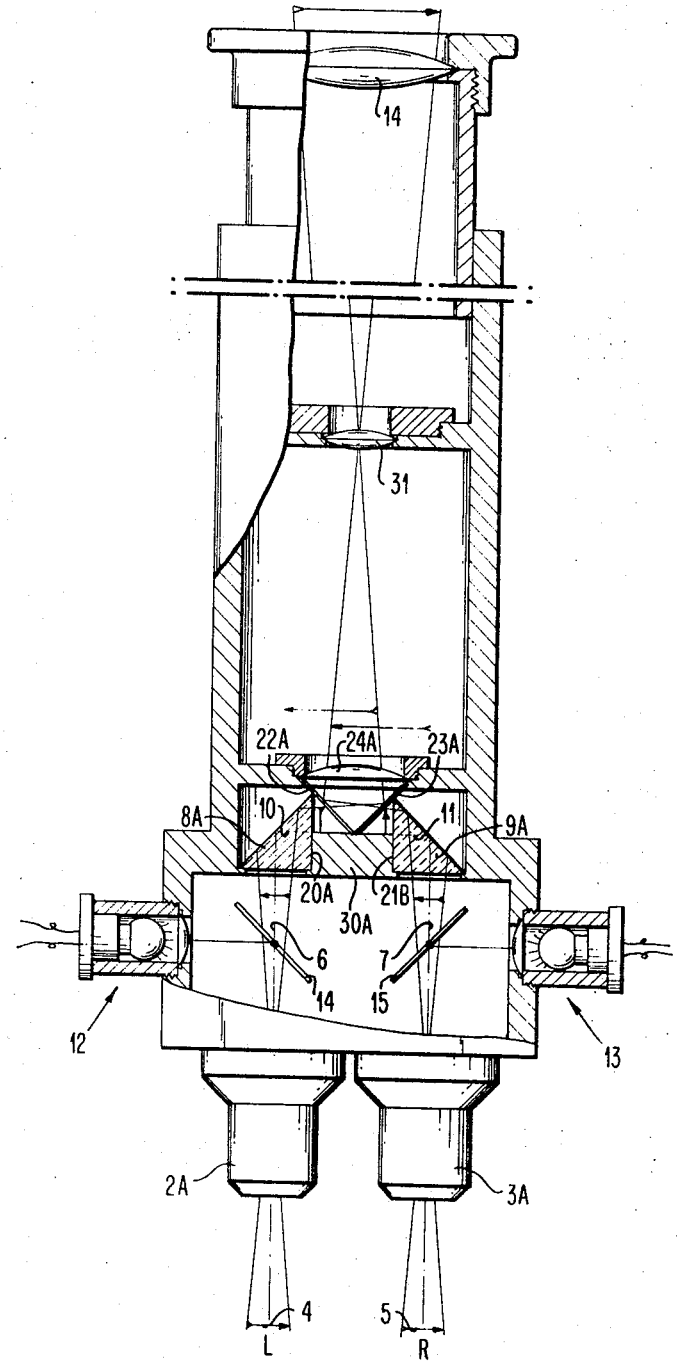

United States Patent Office 3,547,513
Patented Dec. 15, 1970

3,547,513
SPLIT FIELD OPTICAL COMPARISON SYSTEM
Leonard S. Sheiner, Wappingers Falls, N.Y., assignor to International Business Machines Corporation, Armonk, N.Y., a corporation of New York
Filed June 10, 1968, Ser. No. 735,753
Int. Cl. G02b 21/18, 23/00, 5/04
U.S. Cl. 350—30       6 Claims

ABSTRACT OF THE DISCLOSURE

A comparison microscope in which the image from the objectives is partly masked and converged through an inverted array of beam splitters, and reflected into two paths to the eyepiece of a binocular head to provide an erected or direct image for observation.

FIELD OF THE INVENTION

This invention relates to optical systems and more particularly to an optical system embodied in a comparison microscope for simultaneously viewing complementary portions of two separate objects as a combined image in an erected configuration.

DESCRIPTION OF THE PRIOR ART

Comparison microscopes for employing two objectives in conjunction with an appropriate viewing instrument to produce side-by-side images of separate objects in the focal plane of the viewing instrument are known, and are employed to enable the operator to compare the external features of an object under investigation with a reference surface or to enable the operator to align one object relative to a desired orientation with a reference object. Typical optical systems for such comparisons are described in U.S. Pats. No. 2,040,066 and No. 3,218,908. In general, such systems employ paired objectives which enable two areas of two objects to be imaged in one-half of each eyepiece, so as to enable the areas to be observed simultaneously. However, heretofore, such optical systems involve the inherent disadvantage of causing a transposition or inversion of observed images relative to the objects being viewed. As a result, such transposition and inversion in the images requires a conscious effort on the part of the operator to acclimatize himself to the altered orientation of the objects under comparison.

SUMMARY OF THE INVENTION

In general, the invention comprehends an optical system which includes a viewing instrument in combination with paired objectives for focusing the images of separate objects in side-by-side relationship in one focal plane of the viewing instrument. Each of the objectives has associated therewith individual prisms which direct images of the objects along corresponding optical paths for subsequent reflection into the optical plane of the viewing instrument. Suitable masking means are interposed in both optical paths to eliminate complementary portions of the images with subsequent deflection of the optical path to reconstruct the remaining portions of the images into an erected or direct image for observation in the viewing instrument.

Accordingly, it is an object of this invention to provide an improved optical comparison system for viewing complementary portions of two objects as a direct combined image.

It is another object of this invention to provide an optical comparison system for viewing complementary portions of two objects without transposition of the images thereof in a viewing instrument in which the combined image can be observed by an operator or projected on a screen.

Another object of this invention is to provide an optical comparison system for simultaneously viewing complementary portions of two objects as an erected combined image having an extension coextensive with the extension of the object under examination.

The foregoing and other objects, features and advantages of the invention will be apparent from the following more particular description of the embodiments of the invention, as illustrated in the accompanying drawings.

In the drawings:

BRIEF DESCRIPTION OF THE DRAWINGS

FIG. 1 is a diagrammatic view of an optical system in accordance with the present invention; and FIG. 2 is a schematic view of a comparison microscope embodying the optical system of FIG. 1.

DESCRIPTION OF THE PREFERRED EMBODIMENT

Referring to both drawings, the optical comparison system includes a viewing instrument 1 (such as a conventional eyepiece 1 incorporated within the comparison microscope shown in FIG. 2) and a pair of conventional objectives 2 and 3. Each of the objectives 2 and 3 directs an image of objects 4 and 5 along parallel optical paths 6 and 7 to corresponding relay prisms 8 and 9, which direct the images along corresponding optical paths 10 and 11. For purposes of simplicity and brevity, the present description is directed to both FIGS. 1 and 2 utilizing pure numerals for designating the components of the system in FIG. 1, and utilizing the corresponding numerals in conjunction with the letter A in designating corresponding components in the comparison microscope shown in FIG. 2.

Illumination of the objects under views 4 and 5 may be effected in any conventional manner of which one specific source of illumination is shown in FIG. 2. The illumination may be obtained from a light source 12 and a light source 13 associated with respective objects 2A and 3A. Light source 12A directs a beam of light to a beam splitter 14 which is reflected through objective 2A onto the object under observation. Conversely, light source 13 directs a beam of light against the beam splitter 15 for reflection through objective 3A on the object 5 under observation. Preferably, for optimization of the optical system, the beam splitters 14 and 15 are conventional thin plane 50–50 beam splitters to accommodate maximum reflection of light from the light sources, and maximum transmission of the image of the objects under observation. Also to maximize the effectiveness and flexibility of the comparison microscope, the light sources employed in conjunction therewith are provided with means for varying the intensity of the light beam sources and conversely control the illumination of each of the objects under investigation as required. For example, the illumination of the objects may be adjusted to compensate for the image loss through the beam splitters employed in the optical system or for separate viewing of individual ones of the objects under observation.

Interposed in each of the deflected light paths 10 and 11 are corresponding opaque mask means 20 and 21 for blocking or eliminating a portion of the images under observation, as for example, the portion BC of the article 4 and the portion ED of the article 5. In the comparison microscope of FIG. 2, the masks 20 and 21 are incorporated as an integral part of a support 30 for beam splitters 22A and 23A. The opaque lateral sides 20A and 21B of support 30 are positioned adjacent corresponding prisms 8A and 9A to block the indicated portions of the transmitted images of the objects 4 and 5. The unmasked portions of the images are then directed into the optical plane of the viewing instrument 1 via an arrangement of thin plane 50–50 beam splitters 22 and 23. For subsequent transmission through a field lens 24 to the viewing instrument 1. The unmasked portion AB of the image of object 4 is transmitted through the backside 25 of beam splitter 22 onto the reflective surface 26 of the beam splitter 23 for deflection through field lens 24 for viewing in the viewing instrument 1.

Conversely, the unmasked portion EF of the image of article 5 is transmitted to the backside 27 of beam splitter 23 onto the reflective surface 28 of beam splitter 25 where it is deflected, via the field lens 24, to the viewing instrument 1.

The advantage of utilizing a means for controllably illuminating objects 4 and 5 can be illustrated in the operation of this comparison microscope. Since its description is equally applicable to the optical paths of the images from the corresponding objects 4 and 5, only one description relative to the optical path of the image from object 4 will be set forth. As the light beam from light source 12 impinges on the 50–50 beam splitter 14, half of the light beam passes through the beam splitter and half is reflected for illumination of object 4. As the object 4 is viewed by objective 2A a portion of the light comprising the observed image is reflected by beam splitter 14 and half is transmitted thru the beam splitter to right angle prism 8A where it is deflected (after masking) to the left 50–50 beam splitter 22A where half of the light beam of the image is reflected downwardly against support 30 and half of the image intensity is transmitted to the right beam splitter 23A where again half of this image is transmitted thru the beam splitter and half of the image is reflected via lens 24A, via lens 31 to the eyepiece lens 1A. Thus in an embodiment using a 50–50 beam splitter, only approximately 12½% of the light beam defining object 4 is viewed in eyepiece lens 1A for which appropriate compensation or correction can be made by suitable control of the illumination of object 4 by light source 12. As indicated previously a similar analysis applies for the transmission of the image of objects 5 through the comparison microscope of FIG. 2.

The split image of the two objects 4 and 5 (a portion of the left object 4 plus a complementary portion of the right object 5) reaches the operator's eye in the following manner, with reference to FIG. 2; the two light sources 12 and 13 illuminate the objects 4 and 5 simultaneously. The image from the left objective 2A passes through the light source beam splitter 14 to the right angle prism 8A. Here half of the left image is blocked; and the remaining half of the image passes through the left beam splitter 22A and is reflected vertically from the right beam splitter 23A. Similarly, the image from the right objective 3A passes through the light source beam splitter 15 to the right angle prism 9A. Again, half of the right image is blocked; and the remaining half of the image passes through the right beam splitter 23A and is reflected vertically from the right beam splitter 22A. The half image from the right objective 3A is reflected vertically from the left beam splitter 22A. These two half or split images are real images completely inverted. The object plane of the relay lens 31 lies the vertex of the left and right beam splitters 22A and 23A respectively. The relay lens 31 sees the two split images as one real object. The relay lens 31 magnifies and projects the split image to the focal plane of the eyepiece 1A and provides the operator with a virtual image of half of each object. In a modification of this invention, if the relay lens 31 is substituted with a second objective as in Compound-Compound microscopes, the comparison microscope of this invention will have all the features of a Split-Image microscope plus all the features of a Compound-Compound microscope.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an optical system including a viewing instrument in combination with first and second objectives for focusing the images of separate objects in side-by-side relation in the focal plane of the viewing instrument with said objectives disposed on respective first and second sides of the optical axis thereof:
    (A) a first reflecting means optically aligned with said first objective on said first side of said optical axis for directing a first image corresponding to a first of said objects along a first optical path to the second side of said optical axis;
    (B) a first mask means interposed in said first optical path and eliminating a part of said first image;
    (C) a second reflecting means optically aligned with said second objective on the said second side of said optical axis for directing a second image corresponding to a second of said objects along a second optical path to the said first side of said optical axis;
    (D) a second mask means interposed in said second optical path and eliminating a part of said second image corresponding to and complementary to the masked portion of said first image; and
    (E) beam splitter means optically aligned with said first and second reflecting means for directing the unmasked portions of said first and second images in complementary relationship as a virtual image extening in the focal plane of said viewing instrument.

2. The optical system of claim 1 wherein said viewing instrument includes a relay lens means for inverting said virtual image in an extension corresponding to the extensions of said objects.

3. In an optical system including a viewing instrument in combination with first and second objectives for focusing the images of separate objects in side-by-side relation in a focal plane of the viewing instrument with said first and second objectives are disposed on respective first and second sides of the optical axis thereof:
    (A) a first reflecting means associated with said first objective for directing a first image corresponding to a first of said objects along a first optical path;
    (B) a first mask means interposed in said first optical path for eliminating a part of said first image;
    (C) a second reflecting means associated with said second objective for directing a second image corresponding to a second of said objects along a second optical path;
    (D) a second mask means interposed in said second optical path for eliminating a part of said second image corresponding to and complementary to the masked portion of said first image; and
    (E) a third reflecting means for directing the unmasked portions of said first and second images in complementary relationship as a virtual image extending in the focal plane of said viewing instrument, wherein said third reflecting means comprises adjacent first and second plane beam splitter means disposed on respective ones of a first and second side of the optical axis of said viewing instrument, each of said beam splitters having first and second surfaces for transmitting and reflecting complementary portions of said light beam with said second surfaces disposed adjacent each other;
        (a) said first beam splitter means and a first surface thereof positioned adjacent said first mask means for:
            (i) transmission of said unmasked portions of said first image to the second surface of said second beam splitter means; and
            (ii) reflection of the said unmasked portion of said second image from the second surface thereof into the said focal plane; and (b) said second beam splitter means and the first surface thereof positioned adjacent said second mask means for:
(i) transmission of said unmasked portion of said second image to the said second surface of said first beam splitter means; and
(ii) reflection of the said unmasked portion of said first image from the second surface thereof into said focal plane.

4. The optical system of claim 3 wherein said viewing instrument includes a relay lens means for inverting said virtual image in an extension corresponding to the extensions of said objects.

5. In an optical system including a viewing instrument in combination with first and second objectives for focusing the images of separate objects in side-by-side relation in the focal plane of the viewing instrument wherein said objectives are disposed on respective first and second sides of the optical axis of said viewing instrument:
(A) a first prism means associated with said first objective on said first side of said optical axis for directa first image corresponding to a first of said objects along a first optical path to the said second side of said optical axis;
(B) a first mask means interposed in said first optical path for eliminating a part of said first image;
(C) a second prism means associated with said second objective on the said second side of said optical axis for directing a second image corresponding to a second of said objects along a second optical path to the said first side of said optical axis;
(D) a second mask means interposed in said second optical path for eliminating a part of said second image corresponding to and complementary to the masked portion of said first image; and
(E) a reflecting means for directing the unmasked portions of said first and second images in complementary relationship as a virtual image extending in the focal plane of said viewing instrument with said reflecting means comprising first and second plane beam splitter means disposed on respective ones of said first and second sides of said optical axis, each of said beam splitter means having first and second surfaces for transmitting and reflecting complementary portions of a light beam with said second surfaces disposed adjacent each other;
(a) said first beam splitter means and a first surface thereof positioned adjacent said first mask means for:
(i) transmission of said unmasked portions of said first image to the second surface of said second beam splitter; and
(ii) reflection of said unmasked portion of said second image from the second surface thereof into the said focal plane; and
(b) said second beam splitter means and the first surface thereof positioned adjacent said second mask means for:
(i) transmission of said unmasked portion of said second image to the said second surface of said first beam splitter means; and
(ii) reflection of the said unmasked portion of said first image from the second surface thereof into said focal plane.

6. The optical system of claim 5 wherein said viewing instrument includes a relay means for inverting said virtual image in an extension corresponding to the extension of said objects.

References Cited

UNITED STATES PATENTS 3,405,990  10/1968  Nothnagle et al. _____ 350—15

FOREIGN PATENTS 594,728  1925  France _____ 350—171
509,308  1930  Germany _____ 356—166

PAUL R. GILLIAM, Primary Examiner

U.S. Cl. X.R.

350—33, 286; 95—18, 44